(12) United States Patent
Stakheev et al.

(10) Patent No.: US 7,850,935 B2
(45) Date of Patent: Dec. 14, 2010

(54) PROCESS AND CATALYST SYSTEM FOR NOX REDUCTION

(75) Inventors: Alexandr Yu. Stakheev, Moscow (RU); Pär Gabrielsson, Helsingborg (SE)

(73) Assignee: Haldor Topsøe A/S, Lyngby (DK)

( * ) Notice: Subject to any disclaimer, the term of this patent is extended or adjusted under 35 U.S.C. 154(b) by 0 days.

(21) Appl. No.: 12/550,466

(22) Filed: Aug. 31, 2009

(65) Prior Publication Data

US 2010/0055013 A1    Mar. 4, 2010

(30) Foreign Application Priority Data

Sep. 4, 2008    (DK) ................. 2008 01231

(51) Int. Cl.
   *B01D 53/56* (2006.01)
   *B01D 53/86* (2006.01)
   *B01D 53/94* (2006.01)

(52) U.S. Cl. ............ 423/213.2; 423/239.1; 422/177; 422/180; 60/299

(58) Field of Classification Search ............ 423/213.2, 423/239.1; 422/177, 180; 60/299
   See application file for complete search history.

(56) References Cited

U.S. PATENT DOCUMENTS

| | | | |
|---|---|---|---|
| 5,336,476 A | 8/1994 | Kintaichi et al. | |
| 5,853,679 A | 12/1998 | Tabata et al. | |
| 6,399,035 B1 | 6/2002 | Tabata et al. | |
| 6,703,343 B2 | 3/2004 | Park | |
| 2003/0171216 A1 | 9/2003 | Park | |
| 2006/0133977 A1 | 6/2006 | Male et al. | |
| 2007/0092421 A1 | 4/2007 | Hancu et al. | |

FOREIGN PATENT DOCUMENTS

| | | |
|---|---|---|
| EP | 1 547 669 A1 | 6/2005 |
| JP | 6-198173 A * | 7/1994 |
| WO | WO 2006/093802 A2 | 9/2006 |

OTHER PUBLICATIONS

K. Eranen et al., Continuous reduction of NO with octane over a silver/alumina catalyst in oxygen-rich exhaust gases: combined heterogeneous and surface-mediated homogeneous reactions, *Journal of Catalysis*, vol. 219, No. 1, Oct. 1, 2003, abstract.

* cited by examiner

*Primary Examiner*—Timothy C Vanoy
(74) *Attorney, Agent, or Firm*—Dickstein Shapiro LLP

(57) ABSTRACT

Process for reducing nitrogen oxides to nitrogen in an exhaust gas comprising passing the exhaust gas in the presence of an oxygen-containing organic reducing agent through a catalyst system comprising at least two catalyst beds, in which a first catalyst bed comprises only alumina and a second catalyst bed downstream comprises only indium supported on alumina.

11 Claims, 2 Drawing Sheets

PROCESS AND CATALYST SYSTEM FOR NOX REDUCTION

BACKGROUND OF THE INVENTION

1. Field of the Invention

The present invention concerns a process and catalyst system for reduction of nitrogen oxides from exhaust gases using an oxygen-containing hydrocarbon reducing agent, such as dimethyl ether (DME). In particular the invention relates to dual-bed catalyst system for reduction of nitrogen oxides using an oxygen-containing hydrocarbon reducing agent in which the first catalyst bed contains alumina and the second catalyst bed contains indium supported on alumina. The process and catalyst system is suitable for use in the reduction of nitrogen oxides in stationary applications, such as reduction of nitrogen oxides from exhaust gases in power plants. More particularly, the process and catalyst system is used for reduction of nitrogen oxides in automotive applications, such as in lean-burn internal combustion engines.

2. Description of the Related Art

The emission of nitrogen oxides by exhaust gases in stationary and automotive applications has long been a major environmental issue and it is steadily subjected to more stringent environmental regulations. The harmful effects of nitrogen oxides ($NO_x$) are well known and therefore intensive research is being conducted to find processes and catalyst systems which are able to cope with stricter environmental regulations. In conventional stationary $NO_x$ reduction systems, such as in processes for the reduction of $NO_x$ to nitrogen ($N_2$) from exhaust gases of power plants, ammonia is used as reducing agent in selective catalytic reduction (SCR). The use of ammonia is however becoming less and less attractive, as environmental regulations are also pushing down the permissible levels of ammonia emissions. Therefore, the use of oxygen containing hydrocarbons such as dimethyl ether (DME) as reducing agent instead of ammonia is becoming attractive, although operation is normally restricted to a narrow temperature range. It would thus be desirable to be able to use such hydrocarbon reducing agents without impairing the catalyst activity towards NOx reduction to nitrogen and at a wide range of temperatures.

In the automotive industry engine manufacturers are also faced with the task of providing systems for NOx reduction in lean combustion engines. However, it has been difficult to come up with a process and catalyst system which not only removes NOx properly, i.e. provides high NOx conversion, but also operates at a wide temperature window in the presence of an oxygen containing hydrocarbon as reducing agent.

U.S. Pat. No. 5,336,476 discloses a process for reduction of NOx to nitrogen in which exhaust gas is contacted with a reducing catalyst that may be in the form of acidic metal oxides such as alumina, titanium oxide, zirconium oxides and mixtures thereof, and in the presence of an oxygen-containing organic compound such as dimethyl ether. The exhaust gas may be subsequently passed through an oxidizing catalyst containing noble metals, base metals or perovskite oxides on a carrier such as active alumina, silica or zirconia.

US 2007/0092421 describes a catalyst system for NOx reduction in the presence of an organic reducing agent in which a first zone comprises a catalyst support together with a catalytic metal comprising gallium and at least one promoting metal selected from the group of silver, gold, vanadium, zinc, tin, bismuth, cobalt, molybdenum, tungsten, indium and mixtures thereof. In a second zone subsequent the first zone the catalyst system comprises a catalyst support and a catalytic metal selected from the group of indium, copper, manganese, tungsten, molybdenum, titanium, vanadium, iron, cerium and mixtures thereof. The catalyst support in either zone comprises at least one of alumina, titania, zirconia, ceria, silicon carbide and mixtures thereof. The reducing agent includes alcohols, ethers such as dimethyl ether (DME), esters and others.

U.S. Pat. No. 6,703,343 discloses a catalyst for lean NOx exhaust comprising a specially prepared metal oxide catalyst support. This citation mentions independently the use of alumina or indium on alumina as a catalyst suitable for lean NOx reactions at high temperature in the presence of propene as reducing agent.

SUMMARY OF THE INVENTION

It is an object of the present invention to provide a process and catalyst system with superior NOx conversion than prior art systems.

It is another object of the invention to provide a process and catalyst system which exhibits not only superior NOx conversion than prior art systems, but also high conversion at a wide range of temperatures.

It is further object of the invention to provide for a process and catalyst system which is simple and thereby less expensive than prior art catalyst systems.

It is yet another object of the invention to provide a process and catalyst system which eliminates the need of resorting to ammonia as reducing agent and concomitant risks of emitting ammonia to the atmosphere.

These and other objects are solved by the invention.

We have found that by providing a catalyst system in which a first bed contains alumina and a second bed contains indium supported on alumina, a surprisingly high NOx conversion is obtained which is preserved at a wider temperature range than it is possible with either alumina alone or indium supported on alumina alone.

Accordingly, in a first aspect of the invention, we provide a process for reducing nitrogen oxides to nitrogen in an exhaust gas comprising passing the exhaust gas in the presence of an oxygen-containing organic reducing agent through a catalyst system comprising at least two catalyst beds, in which a first catalyst bed comprises only alumina and a second catalyst bed downstream comprises only indium supported on alumina.

The oxygen-containing organic reducing agent is selected from the group consisting of ethers, esters, alcohols, ketones and combinations thereof. Preferably, the oxygen-containing organic reducing agent is dimethyl ether (DME). The organic reducing agent may for instance be added to the exhaust gas to give concentrations in the gas of 500 to 5000 ppmv, preferably 1000 ppmv. It would be appreciated that the reduction of nitrogen oxides in the presence of the organic reducing agent requires also the presence of oxygen in the exhaust gas. Accordingly, the exhaust gas contains at least 1 vol % oxygen, more preferably at least 5 vol % oxygen, for instance 7 vol % or more.

We have found that alumina ($Al_2O_3$) alone provides $NO_x$ conversions of about 800 with DME as reducing agent at temperatures above 320° C. but below about 450° C., while indium supported on alumina ($In/Al_2O_3$) provides activity in the temperature range 250-400° C. with DME as reducing agent with top NOx conversions at about 85% in the temperature range 300 to 350° C., more specifically at about 325° C. Yet the provision of alumina on the first catalyst bed and indium on alumina in the second catalyst bed results in a dual-layer catalyst system which provides NOx conversions to nitrogen of 90% or higher over a broader temperature range that spans from 320° C. to 550° C.

As used herein the term "dual-layer catalyst system" means a catalyst system comprising at least two catalyst beds, an upstream bed (first catalyst bed) and a subsequent downstream bed (second catalyst bed).

In one embodiment of the invention, the amount of indium or indium oxide in the second catalyst bed is 0.5 to 5 wt %. Preferably the amount of indium or indium oxide in the alumina of the second catalyst is 1 wt % or below. In the presence of DME as reducing agent in the dual-layer catalyst system of the invention we find that even with only 1 wt % indium in the alumina, NOx conversion can be kept high (above 90%). Thus, the invention enables a cost-process since less amounts of expensive indium compared to prior art systems are required. For instance, NOx conversions of less than 80% are obtained in U.S. Pat. No. 6,703,343 with the best indium on alumina system having 2.5 wt % indium and using propane as reducing agent. The process and catalyst system of the present invention is also simpler and less expensive than prior art systems such as those of US 2007/0092421, in which the first catalytic bed requires gallium and at least one promoting metal selected from the group of silver, gold, vanadium, zinc, tin, bismuth, cobalt, molybdenum, tungsten, indium and mixtures thereof.

In another embodiment of the invention, the process further comprises providing a third catalyst bed downstream the second catalyst bed, in which the catalyst comprises platinum supported on alumina. Preferably the third catalyst bed comprises only platinum supported on alumina. More preferably the amount of platinum in the third catalyst is 1 to 5 wt % Pt on alumina. The provision of a third bed of platinum on alumina does not alter the NOx conversion, but enables an improvement of DME conversion.

Although a catalyst bed is said to comprise only alumina or indium supported on alumina, it would be understood that alumina may contain minor amounts of impurities which preferably are kept at a low level. Accordingly, in a further embodiment of the invention the content of impurities in the form of alkali metals measured as oxides and sulphur measured as sulphate in the alumina of the catalyst beds is below 0.5 wt %. The lower the content of sulphur and alkali metals, particularly sodium and potassium, the higher the activity of the catalyst system towards NOx reduction, i.e. the higher the NOx conversion to nitrogen. The impurity level is kept low (below 0.5 wt %) by for instance washing the alumina with $NH_4NO_3$ solution followed by calcination according to standard techniques. In a specific embodiment, the alumina catalyst is prepared by washing with a $NH_4NO_3$ solution followed by calcination at 500° C. in flowing air (300 ml/min) where the temperature was increased from room temperature to 500° C. at a rate of 0.5° C./min.

In yet another embodiment, the process further comprises providing at least one layer of inert material in between the first and second catalyst bed. The inert layer material is preferably quartz ($SiO_2$) which is provided as a thin layer, such as a 5 mm quartz layer. We have found that DME conversion in particular over this type of combined catalyst is also essentially the same as for pure $In/Al_2O_3$ or the $Al_2O_3+In/Al_2O_3$ combined catalyst of the present invention. This means, on the one hand, that gas-phase effects are negligible between these two catalysts, and, on the other hand, that the combination of $Al_2O_3$ and $In/Al_2O_3$ catalyst enables to obtain the catalytic system which combines advantages of the both catalysts. The sandwiching of a layer of inert material in between the alumina and indium/alumina catalyst beds enable complete separation of these active beds. In other words, the mixing of alumina with indium/alumina catalyst is avoided, especially at the interface of the catalyst beds which may cause undesirable local drop in catalytic activity. Catalytic data show that the performance of mechanically mixing particles of $Al_2O_3$—$In/Al_2O_3$ catalyst is inferior compared to the performance of layered $Al_2O_3$—$In/Al_2O_3$ catalyst.

The process of the invention is particularly suitable for automotive applications, more particularly the treatment of exhaust gases from lean combustion engines, such as diesel engines, in which nitrogen oxide reduction is conducted with a hydrocarbon, here preferably DME in amounts ranging from 500 to 5000 ppmv, more preferably 1000 ppmv, and in an environment containing at least 1 vol % oxygen, more preferably at least 5 vol % oxygen, for instance 7 vol % or more.

The exhaust gas may be passed to the catalyst bed system at gas space velocity GHSV of 5000 to 50000 $hr^{-1}$, for instance at 30000 $hr^{-1}$ and at temperatures in the range 200 to 600° C. or more preferably 200 to 550° C. The content of NO in the exhaust gas may span from 100 to 2000 ppmv, but is normally in the range 200 to 1000 ppmv, for instance 300 or 500 ppmv. The content of water in the exhaust gas may also vary and is normally in the range 2 to 10 vol %, often 4 to 7 vol %.

In a second aspect, the invention encompasses also the catalyst system used in the process. Accordingly, we provide also a catalyst system for reduction of nitrogen oxides from exhaust gases comprising at least two catalyst beds, in which a first catalyst bed comprises only alumina and a second catalyst bed downstream comprises only indium supported on alumina.

The amount of indium or indium oxide in the second catalyst bed is preferably 0.5 to 5 wt %. More preferably, in order to provide a more inexpensive catalyst system, the amount of indium or indium oxide in the alumina of the second catalyst is 1 wt % or below.

The volume ratio the first catalyst bed with respect to the second catalyst bed may vary. It can span from for instance 3:1 to 1:3, but is preferably 1:1.

In order to reduce the risk of a drop in catalyst activity, the content of impurities in the form alkali metals measured as oxides and sulphur measured as sulphate in the alumina of the catalyst beds is below 0.5 wt %.

In another embodiment the catalyst system may further comprise at least one inert layer of material in between the first and second catalyst bed, as set forth in claim 10. This enables, as explained before, a reduction on the potential mechanical mixing of alumina ($Al_2O_3$) and indium on alumina ($In/Al_2O_3$) particles at the interface of the first and second catalyst bed, which may cause undesirable local drop in catalytic activity due to inferior performance of mechanically mixed $Al_2O_3$—$In/Al_2O_3$ with respect to layered $Al_2O_3$—$In/Al_2O_3$.

The invention encompasses also the use of the catalyst system for the treatment of exhaust gases from lean combustion engines, i.e. as lean NOx catalyst in automotive systems, as well as for the treatment of exhaust gases from gas turbines and boilers i.e. NOx removal in large stationary systems.

Preferably, the catalyst system of this embodiment is used in the presence of an oxygen-containing organic reducing agent which is selected from the group consisting of ethers, esters, alcohols, ketones and combinations thereof. More preferably, the oxygen-containing organic reducing agent is dimethyl ether (DME).

DETAILED DESCRIPTION OF THE PREFERRED EMBODIMENTS

Figure 1:
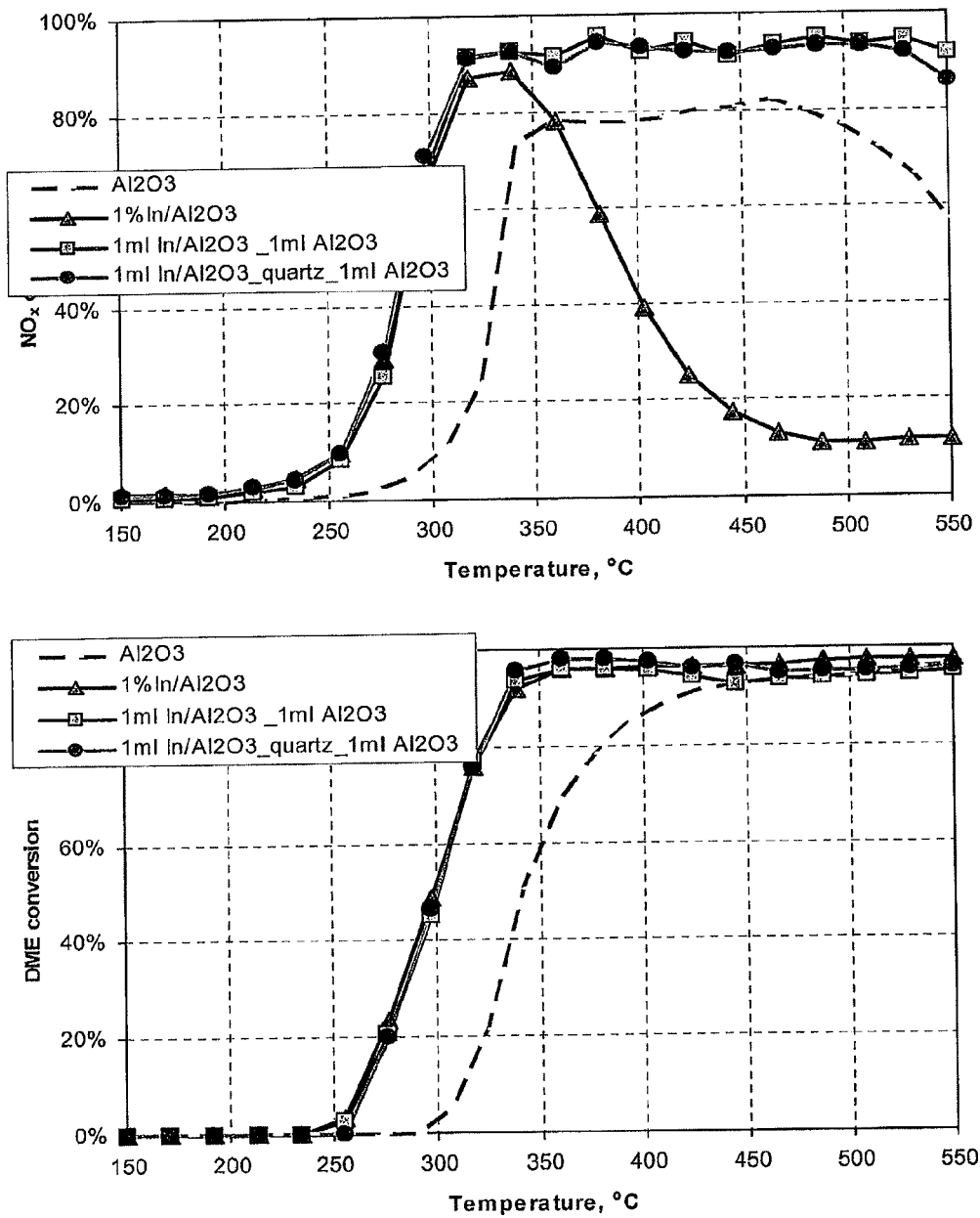
FIG. 1 shows the performance of layered 1 wt % $In/Al_2O_3$ and $Al_2O_3$ catalyst in the presence of DME as organic reducing agent. Top part: NO conversion; Bottom part: DME conversion. Conditions: GHSV=30000 $h^{-1}$, feed gas composition: 300 ppm NO, 7% $O_2$, 4% $H_2O$, 1000 ppm DME, 10% $CO_2$ balance with $N_2$.

The single catalyst systems $Al_2O_3$, particularly $Al_2O_3$ washed for removal of alkaline impurities, and $In/Al_2O_3$ ($Al_2O_3$ optionally also washed for impurities) were used for NOx reduction in the presence of DME as the oxygen-containing organic reducing agent. As shown in FIG. 1, $Al_2O_3$ provides good NOx conversion at temperatures above 320° C. but drops sharply at temperatures above 450° C., while $In/Al_2O_3$ provides reasonably good activity only in the temperature range 250-400° C. and tops at about 80-85% NOx conversion at 300-350° C.

The alumina catalyst consists of a commercial $Al_2O_3$ (SASOL N1) prepared by washing with a $NH_4NO_3$ solution followed by calcination at 500° C. in flowing air (300 ml/min). The temperature was increased from room temperature to 500° C. at a rate of 0.5° C./min.

The $In/Al_2O_3$ catalyst (1 wt % In) was prepared by incipient-wetness impregnation: 10 g $Al_2O_3$ (Puralox NWa 155, Product code 580131) was loaded with 1 wt % In by incipient-wetness impregnation with a water solution of $In(NO_3)_3$ (7.6 ml), containing 0.013 g In/ml; the product was dried overnight at room temperature in air. The resulting material was calcined at 550° C. (2 h) in flowing air (~300 ml/min); the temperature was increased from room temperature to 550° C. at a rate of 0.5° C./min.

The performance of the dual-layer catalyst system is also shown in FIG. 1. The first layer (first catalyst bed) is filled with $Al_2O_3$ and the second layer (second catalyst bed) is filled with $In/Al_2O_3$. The performance of this dual-layer catalyst is also compared with the performance of the catalytic system designed by separation of $In/Al_2O_3$ and $Al_2O_3$ layers by 5 mm of quartz as inert layer.

It is apparent that the combination of the two single catalysts in the one catalytic system according to the invention provides an unexpected synergistic effect as it enables not only an increase in NOx conversion compared to each single catalyst but also the expansion of the temperature window of effective catalyst operation. NOx conversion exceeds ~90% over the combined dual-layer catalyst $Al_2O_3$+$In/Al_2O_3$ in a temperature range as wide as 320° C. to 550° C. The dependence of DME conversion on temperature is very similar to that observed over $In/Al_2O_3$ catalyst, as shown in the bottom part of FIG. 1.

Essentially the same performance was observed for the catalyst in which two beds of $Al_2O_3$ and $In/Al_2O_3$ were separated by 5 mm quartz layer (layer of inert material). DME conversion over this type of combined catalyst is also essentially the same as for pure $In/Al_2O_3$ or $Al_2O_3$+$In/Al_2O_3$ combined catalyst (FIG. 1, bottom part). These data show that gas-phase processes are negligible between these two catalyst layers. This shows also that physical separation of the first and second bed is possible without impairing catalytic activity. This can be advantageous, since mechanical mixing, e.g. simply blending, of $Al_2O_3$ and $In/Al_2O_3$ particles, as shown in FIG. 2, may cause a drop in activity and thereby drop in NOx conversion, particularly local drops of activity at the interface of the first and second catalyst bed.

Figure 2:
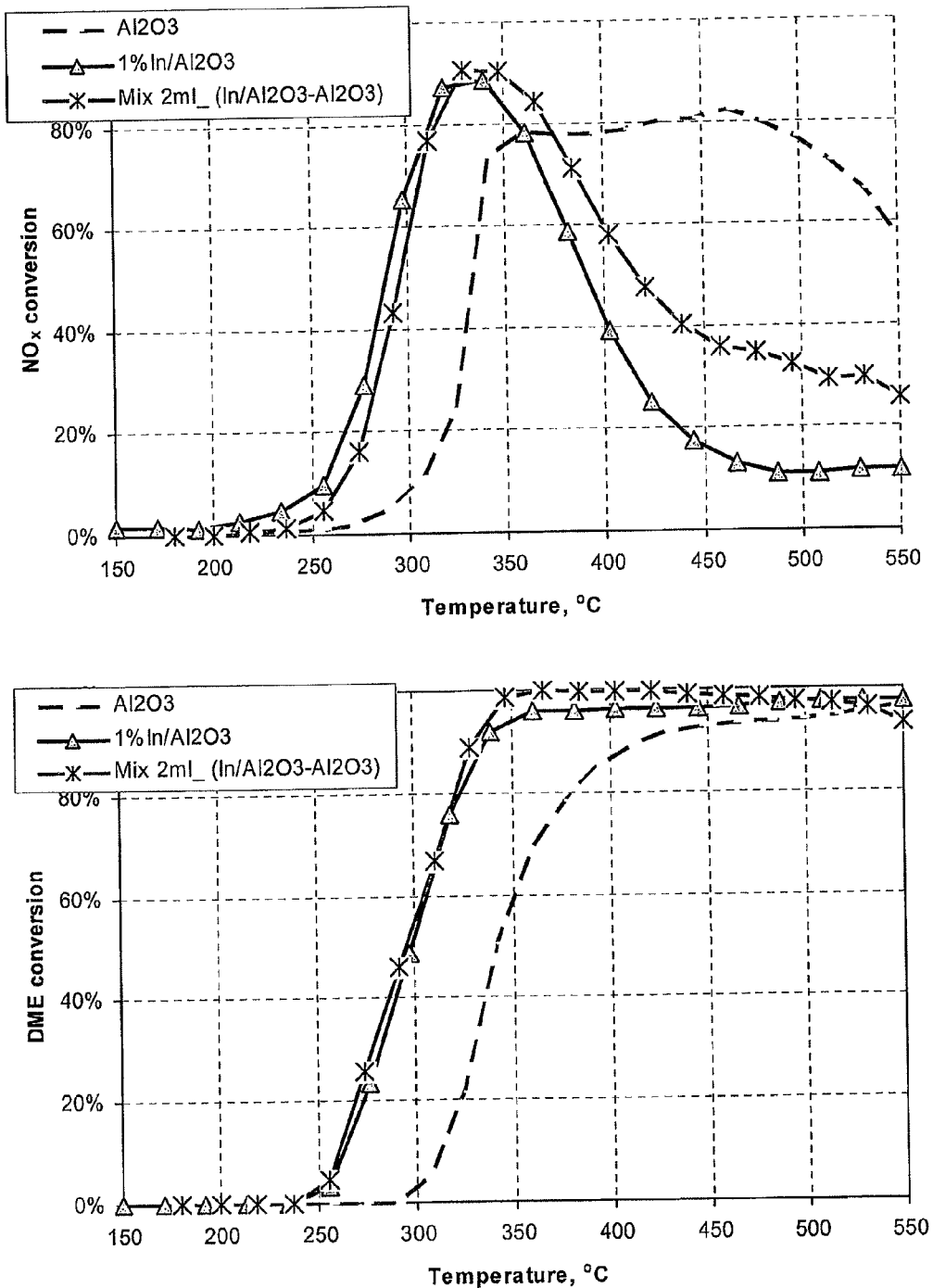
FIG. 2 shows the performance of mixed catalyst 1 wt % $In/Al_2O_3$ and $Al_2O_3$ (2 ml) in the presence of DME as organic reducing agent. Top part: NO conversion; Bottom part: DME conversion. Conditions: GHSV=30 000 $h^{-1}$, feed gas composition: 300 ppm NO, 7% $O_2$, 4% $H_2O$, 1000 ppm DME, 10% $CO_2$ balance with $N_2$.

Turning now more specifically to FIG. 2, this figure shows the performance of the mechanical mixture of $In/Al_2O_3$ and $Al_2O_3$ particles. It is apparent that $NO_x$ conversion of the mixture is essentially the same or slightly better with respect to the single $In/Al_2O_3$ catalyst. $NO_x$ conversion at reaction temperatures above 350° C. rapidly decreases although it remains slightly higher compared to the $In/Al_2O_3$ catalyst alone. The DME conversion curve is essentially the same or slightly better with respect to the $In/Al_2O_3$ catalyst (FIG. 2, bottom part). These catalytic data reveal that the performance of mixed $In/Al_2O_3$—$Al_2O_3$ catalyst is inferior compared to the performance of the layered $Al_2O_3$+$In/Al_2O_3$ catalyst of the present invention. The most possible reason for the lower $NO_x$ conversion is a depletion of the reaction mixture supplied to the $Al_2O_3$ part of the catalyst at reaction temperatures above 320° C., where $In/Al_2O_3$ effectively oxidizes DME in the feed gas.

In summary,

Combination of $Al_2O_3$ and $In/Al_2O_3$ catalyst in a double layer catalyst, where the first layer (first catalyst bed) consists of $Al_2O_3$ and the second layer (second catalyst bed) consists of $In/Al_2O_3$, enables the extension of the temperature window for NOx reduction in the presence of DME as oxygen containing organic reducing agent. The combined catalyst provides effective DME conversion in the temperature window 250 to 550° C. and $NO_x$ conversion above 90% at reaction temperatures in the range 320-550° C.

This particular combination provides an effective $NO_x$ conversion by DME at 250-320° C. over downstream $In/Al_2O_3$ catalyst, while at the higher reaction temperature the $Al_2O_3$ top layer operates, apparently at least up to 450° C. Above this temperature high NOx conversion of about 90% is still surprisingly maintained.

Mechanical mixture of $In/Al_2O_3$ and $Al_2O_3$ demonstrates performance which is inferior to the performance of layered $Al_2O_3$—$In/Al_2O_3$ catalyst. The most probable reason of the inferior performance of this system is depletion of the reaction mixture in DME catalyst, which is effectively oxidized over $In/Al_2O_3$ at relatively low reaction temperature.

What is claimed is:

1. Process for reducing nitrogen oxides to nitrogen in an exhaust gas comprising passing the exhaust gas in the presence of an oxygen-containing organic reducing agent through a catalyst system comprising at least two catalyst beds, in which a first catalyst bed comprises only alumina and a second catalyst bed downstream comprises only indium supported on alumina.

2. Process according to claim 1, wherein the oxygen-containing organic reducing agent is selected from the group consisting of ethers, esters, alcohols, ketones and combinations thereof.

3. Process according to claim 2, wherein the oxygen-containing organic reducing agent is dimethyl ether (DME).

4. Process according to claim 1, wherein the amount of indium or indium oxide in the second catalyst bed is 0.5 to 5 wt %.

5. Process according to claim 1, further comprising providing a third catalyst bed downstream the second catalyst bed, in which the third catalyst comprises platinum supported on alumina.

6. Process according to claim 2, wherein the amount of platinum in the third catalyst is 1 to 5 wt %.

7. Process according to claim 1, wherein the content of impurities in the form alkali metals measured as oxides and sulphur measured as sulphate in the alumina of the catalyst beds is below 0.5 wt %.

8. Process according to claim 1, further comprising providing at least one inert layer of material in between the first and second catalyst bed.

9. Catalyst system for reduction of nitrogen oxides from exhaust gases comprising at least two catalyst beds, in which a first catalyst bed comprises only alumina and a second catalyst bed downstream comprises only indium supported on alumina.

10. Catalyst system according to claim 9, further comprising at least one inert layer of material in between the first and second catalyst bed.

11. Use of the catalyst system of claim 9 for the treatment of exhaust gases from lean combustion engines, gas turbines and boilers comprising passing the exhaust gas emitted from either a lean combustion engine, gas turbine or boiler through the catalyst system of claim 9.

* * * * *